United States Patent [19]

Nagano

[11] Patent Number: 4,632,959
[45] Date of Patent: Dec. 30, 1986

[54] MODIFIED POLYOLEFIN COMPOSITION

[75] Inventor: Riichiro Nagano, Hiroshima, Japan

[73] Assignee: Mitsui Petrochemical Industries, Ltd., Tokyo, Japan

[21] Appl. No.: 651,894

[22] Filed: Sep. 19, 1984

[30] Foreign Application Priority Data

Sep. 19, 1983 [JP] Japan .................................. 58-171183

[51] Int. Cl.$^4$ .............................................. C08L 51/00
[52] U.S. Cl. ........................................ 525/70; 525/57; 525/63; 525/72; 525/74; 525/78; 525/80; 525/100; 525/167; 525/178
[58] Field of Search ...................... 525/70, 324, 57, 63, 525/72, 74, 78, 80, 100

[56] References Cited

U.S. PATENT DOCUMENTS 4,483,965 11/1984 Ohba et al. ........................... 525/324

Primary Examiner—Jacob Ziegler
Attorney, Agent, or Firm—Sherman and Shalloway

[57] ABSTRACT

A modified polyolefin composition comprising
(A) 50 to 99 parts by weight of a modified polyolefin having an intrinsic viscosity [$\eta$] of 0.5 to 10 dl/g and a degree of crystallization of at least 20% selected from the group consisting of polyolefins modified with styrene-type hydrocarbons, polyolefins modified with unsaturated epoxy compounds, polyolefins modified with unsaturated silane compounds, halogenated polyolefins and hydroxyl group-containing polyolefins, and
(B) 1 to 50 parts by weight of a thermoplastic polymer selected from the group consisting of
(B-1) thermoplastic polymers having a flexural modulus of less than 1000 kg/cm$^2$, a glass transition temperature (Tg) of not higher than 0° C. and a weight average molecular weight ($\overline{M}w$) of at least 400,000, and
(B-2) polar non-olefinic thermoplastic polymers or ethylenic polymers having a flexural modulus of at least 1000 kg/cm$^2$ and an adhesion strength, with respect to the modified polyolefin (A), of not more than 200 g/cm.

The above composition is useful as an adhesive.

17 Claims, No Drawings

MODIFIED POLYOLEFIN COMPOSITION

This invention relates to a modified polyolefin composition. More specifically, it relates to a modified polyolefin composition having improved adhesion, particularly to polar materials.

The term "modified polyolefin", as used herein, denotes a polymer having an olefin as a main component, which has been modified by introducing a functional group in accordance with such techniques as random copolymerization, block copolymerization, graft copolymerization, halogenation or saponification.

Techniques of modifying polyolefins by introducing functional groups have been widely used. For example, an epoxy group is introduced in order to improve the adhesion or heat resistance of polyolefins, or a halogen-containing group is introduced into polyolefins in order to improve their weatherability, water resistance and chemical resistance. The polyolefins intrinsically have poor adhesion to polar materials such a metals, concrete, polar resins, wood, etc. Since in many cases the introduction of such functional groups also improves the adhesion of the polyolefins to such polar materials, the modified polyolefins are used as laminates with these materials, or as intermediate adhesive layers of laminates of these polar materials. They are also used as a paint, etc. for surface protection of these polar materials.

The adhesion of these modified polyolefins, however, is not entirely sufficient, and it has been desired to improve their adhesion while they retain the other properties improved by modification. Specifically, such modified polyolefins have the defect that their adhesiveness is low depending upon the type of modification and the polar materials to which they are bonded, and they easily peel off under severe use conditions or under certain bonding conditions. Japanese Laid-Open Patent Publication No. 127613/1981 discloses an easily peelable heat sealing material composed of a blend of a propylene polymer and a modified ethylene polymer obtained by grafting 40 to 95% by weight of an ethylene polymer with 60 to 5% by weight of an aromatic vinyl monomer. This resin composition positively utilizes the aforesaid easy peelability of the modified polyolefins.

We have made investigations in order to remedy such a defect, and found that a composition prepared by finely dispersing a specific proportion of a thermoplastic polymer having specific properties in a certain modified polyolefin having a functional group introduced thereinto elminates the aforesaid defect.

According to this invention there is provided a modified polyolefin composition comprising (A) 50 to 99 parts by weight of a modified polyolefin having an intrinsic viscosity $[\eta]$ of 0.5 to 10 dl/g and a crystallinity of at least 20% selected from the group consisting of polyolefins modified with styrene-type hydrocarbons, polyolefins modified with unsaturated epoxy compounds, polyolefins modified with unsaturated silane compounds, halogenated polyolefins and hydroxyl group-containing polyolefins, and (B) 1 to 50 parts by weight of a thermoplastic polymer selected from the group consisting of (B-1) thermoplastic polymers having a flexural modulus of less than 1000 kg/cm$^2$, a glass transition temperature (Tg) of not higher than 0° C. and a weight average molecular weight ($\overline{M}w$) of at least 400,000, and (B-2) polar non-olefinic thermoplastic polymers or ethylenic polymers having a flexural modulus of at least 1000 kg/cm$^2$ and an adhesion strength, with respect to the modified polyolefin (A), of not more than 200 g/cm.

The modified polyolefin (A) as a main component of the modified polyolefin composition of this invention is a polymer composed mainly of an α-olefin. The α-olefin as a base may be an α-olefin which may have a branched chain, such as ethylene, propylene, 1-butene, 1-pentene, 1-hexene, 4-methyl-1-pentene, 3-methyl-1-pentene, 1-octene, 1-decene, 1-dodecene, 1-hexadecene, 1-octadecene, or 1-eicosene. Such as olefin may generally have 2 to 20, preferably 2 to 16, more preferably 2 to 10 carbon atoms.

The modified polyolefin (A) can be prepared by introducing a functional group by such a technique as described hereinbelow into a polyolefin prepared by homopolymerization of the above-exemplified α-olefin or the copolymerization of two or more such α-olefins. Or it can be prepared by copolymerizing the aforesaid α-olefin with a monomer containing a functional group or a precursor group easily convertible to a functional group. Specific examples of the polyolefin which can be used in the former method are ethylene-type polymers including polyethylene, ethylene/α-olefin copolymers (with an ethylene content of at least 75 mole%) such as an ethylene/propylene copolymer, an ethylene/1-butene copolymer, an ethylene/4-methyl-1-pentene copolymer, an ethylene/1-hexene copolymer, an ethylene/1-octene copolymer and an ethylene/1-decene copolymer, and ethylene/vinyl monomer copolymers (the total vinyl monomer content being not more than 15 mole%) such as an ethylene/vinyl acetate copolymer, an ethylene/ethyl acrylate copolymer, an ethylene/acrylic acid copolymer, a partially neutralized salt of an ethylene/acrylic acid copolymer, an ethylene/methacrylic acid copolymer, a partially neutralized salt of an ethylene/methacrylic acid copolymer, an ethylene/ethyl acrylate/butyl acrylate copolymer, a partially neutralized salt of an ethylene/ethyl acrylate/butyl acrylate copolymer, an ethylene/methacrylic acid/butyl methacrylate copolymer, a partially neutralized salt of an ethylene/methacrylic acid/butyl methacrylate copolymer, an ethylene/maleic anhydride copolymer, an ethylene/maleic anhydride/ethyl acrylate copolymer, and an ethylene/maleic anhydride/butyl acrylate copolymer.

Other useful polyolefins include polypropylene, propylene/α-olefin copolymers (with a propylene content of at least 60 mole%) such as a propylene/ethylene copolymer, a propylene/1-butene copolymer, a propylene/1-hexene copolymer and a propylene/4-methyl-1-pentene copolymer, polybutene-1, 1-butene/α-olefin copolymers (with a 1-butene content of at least 60 mole%) such as a 1-butene/ethylene copolymer, a 1-butene/propylene copolymer, a 1-butene/4-methyl-1-pentene copolymer and a 1-butene/1-hexene copolymer, poly-4-methyl-1-pentene, and 4-methyl-1-pentene/α-olefin copolymers (with a 4-methyl-1-pentene content of at least 80 mole%) such as a 4-methyl-1-pentene/ethylene copolymer, a 4-methyl-1-pentene/propylene copolymer, a 4-methyl-1-pentene/1-decene copolymer, a 4-methyl-1-pentene/1-octadecene copolymer and a 4-methyl-1-pentene/3-methyl-1-pentene copolymer.

Also useful as the base polyolefin used in this invention are grafted products of the aforesaid α-olefin copolymers or ethylene/vinyl monomer copolymers and at least one unsaturated carboxylic acid (the grafted polymers contain not more than 3 mole%, preferably not more than 1 mole%, more preferably not more than 0.5 mole%, of the unsaturated carboxylic acid). The unsaturated carboxylic acid is selected from the group consisting of unsaturated carboxylic acids such as acrylic acid, methacrylic acid, maleic acid, fumaric acid, itaconic acid, citraconic acid, allylsuccinic acid, mesaconic acid, glutaconic acid, Nadic acid, methyl Nadic acid, tetrahydrophthalic acid and methylhexahydrophthalic acid, and unsaturated dicarboxylic acid anhydrides such as maleic anhydride, itaconic anhydride, citraconic anhydride, allylsuccinic anhydride, glutaconic anhydride, Nadic anhydride, methyl Nadic anhydride, tetrahydrophthalic anhydride and methyltetrahydrophthalic anhydride. These polymers are especially useful when in the production of a laminated article, a polymer having barrier properties, such as a polyamide or an ethylene/vinyl alcohol copolymer, is used as one layer.

Generally, these polyolefins have an intrinsic viscosity [$\eta$], measured in decalin at 135° C., of 0.5 to 15 dl/g, a crystallinity, measured by an X-ray diffraction method under the conditions set forth in ASTM D-618, of at least 20%, and a molecular weight distribution [weight average molecular weight ($\overline{Mw}$)/number average molecular weight ($\overline{Mn}$)], measured by the GPC method in o-dichlorobenzene as a solvent at 135° C., of from 1 to 30.

Various modified polyolefins which can be used as the modified polyolefin (A) in the composition of this invention are described below in greater detail.

(A-1) Polyolefins modified with styrene-type hydrocarbons

The styrene-type hydrocarbon-modified polyolefins can usually be produced by graft-polymerizing styrene-type hydrocarbons to such polyolefins as exemplified above.

The styrene-type hydrocarbons preferably include those represented by the following formula

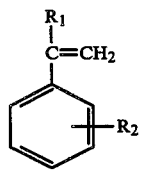

wherein $R_1$ represents a hydrogen, or an alkyl group having 1 to 6 carbon atoms, preferably 1 to 4 carbon atoms, and $R_2$ represents a hydrogen atom, a halogen atom, or an alkyl group having 1 to 6 carbon atoms, preferably 1 to 4 carbon atoms.

Specific examples of such styrene-type hydrocarbons are styrene, alpha-methylstyrene, o-chlorostyrene, p-chlorostyrene, o-methylstyrene, m-methylstyrene, p-methylstyrene, m-ethylstyrene, p-ethylstyrene, o-isopropylstyrene, m-isopropylstyrene and p-isopropylstyrene. Of these, styrene, m-methylstyrene and p-methylstyrene are preferred.

These styrene-type hydrocarbons may be graft-polymerized singly or as a mixture of two or more. The convenient proportion of the styrene-type hydrocarbon to be graft-polymerized is generally $10^{-5}$ to $5\times10^{-3}$ gram-equivalent, preferably $2\times10^{-5}$ to $2\times10^{-3}$ gram-equivalent, more preferably $5\times10^{-5}$ to $1.5\times10^{-3}$ gram-equivalent, per gram of the polyolefin.

Grafting of the styrene-type hydrocarbon to the polyolefin can be carried out by reacting the polyolefin and the styrene-type hydrocarbon in the heat-molten state or in the form of a solution in the presence of a radical initiator [such as benzoyl peroxide, dicumyl peroxide, di-tert.-butyl peroxide, 2,5-dimethyl-2,5-di(-tert.-butylperoxy)hexane-3, $\alpha,\alpha'$-bis(tert.-butylperoxyisopropyl)benzene, or 2,5-dimethyl-2,5-di(tert.-butylperoxy)hexyne-3] by a method known per se (for example, the method described in Japanese Laid-Open Patent Publication No. 16864/1983) or by the method described in Japanese Laid-Open Patent Publication No. 15467/1984.

(A-2) Polyolefins modified with unsaturated epoxy compounds

The unsaturated epoxy compounds-modified polyolefins can be produced by copolymerizing at least one of the above-exemplified olefins with at least one unsaturated epoxy compound, or by graft-polymerizing an unsaturated epoxy compound to the aforesaid polyolefin. These methods are known per se. The former is described, for example, in Japanese Patent Publication No. 27527/1971 or Japanese Laid-Open Patent Publication No. 11388/1973. The latter is described, for example, in Japanese Patent Publication No. 31276/1977. Generally, unsaturated epoxy compound-modified polyolefins obtained by the latter graft-polymerizing method have good adhesion and are preferred.

For example, the graft-polymerization of the unsaturated epoxy compound to the polyolefin can be carried out in the presence of a radical initiator (such as benzoyl peroxide and dicumyl peroxide) in an alkyl aromatic hydrocarbon solvent such as toluene or xylene at a temperature of usually 100° to 160° C.

The unsaturated epoxy compound used in the production of the modified polyolefin is a compound having at least one ethylenically unsaturated bond and at least one epoxy group per molecule. Specific examples include glycidyl esters of unsaturated carboxylic acids such as glycidyl acrylate, glycidyl methacrylate, a mono- or di-glycidyl ester of itaconic acid, a mono- or di-glycidyl ester of citraconic acid, a mono-, di- or tri-glycidyl ester of butenetricarboxylic acid, a mono- or di-glycidyl ester of endo-cis-bicyclo[2.2.1]hept-5-ene-2,3-dicarboxylic acid (Nadic Acid, a trade name), a mono- or di-glycidyl ester of endo-cis-bicyclo-[2.2.1]hept-5-ene-2-methyl-2.3-dicarboxylic acid (Methyl Nadic Acid, a trade name), a mono- and di-glycidyl ester of allylsuccinic acid and glycidyl p-styrenecarboxylate; and glycidyl ethers such as allyl glycidyl ether, 2-methylallyl glycidyl ether and styrene-p-glycidyl ether; and p-glycidyl styrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, and vinyl cyclohexene monoxide. Of these, glycidyl acrylate, glycidyl methacrylate and allyl glycidyl ether are especially preferred.

The proportion of the unsaturated epoxy compound to be polymerized is desirably such that the resulting modified polyolefin contains generally $10^{-6}$ to $10^{-3}$ gram-equivalent, preferably $10^{-5}$ to $5\times10^{-4}$ gram-equivalent, more preferably $2\times10^{-5}$ to $4\times10^{-4}$ gram-equivalent, of epoxy groups per gram of the modified polyolefin.

(A-3) Polyolefin modified with unsaturated silane compounds

These polyolefin modified with unsaturated silane compounds can usually be prepared by graft-polymerizing unsaturated silane compounds to polyolefins.

The unsaturated silane compounds used as modifying agents include those represented by the following formula

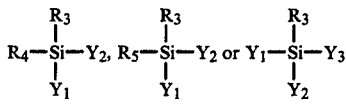

wherein $R_3$ and $R_4$ are identical or different and each represents a hydrocarbon group which has an ethylenically unsaturated bond and which may optionally contain an oxygen atom; $R_5$ represents a halogen atom or an organic group not containing an ethylenically unsaturated bond; and $Y_1$, $Y_2$ and $Y_3$ are identical or different and each represents an organic group capable of being changed to a hydroxyl group by hydrolysis.

The "hydrocarbon group which has an ethylenically unsaturated bond and which may optionally contain an oxygen atom" represented by $R_3$ and $R_4$ is a group having reactivity with the radical site generated in the polyolefin during the graft polymerization, and includes, for example, vinyl, allyl, butenyl, cyclohexenyl and cyclopentadienyl groups. Hydrocarbon groups having an ethylenically unsaturated bond at the terminal are preferred. Other suitable examples include groups containing an ester residue derived from a carboxylic acid having an ethylenically unsaturated bond at the terminal, such as

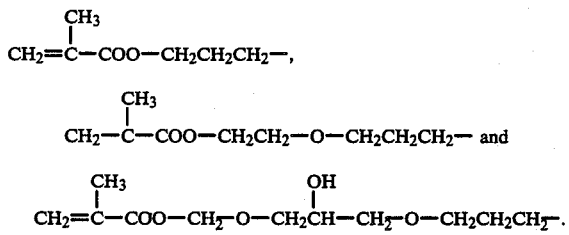

Of these, a vinyl group is especially preferred.

The "halogen atom" represented by $R_5$ is preferably chlorine or bromine. Examples of the "organic group not containing an ethylenically unsaturated bond" include monovalent hydrocarbon groups, for example alkyl groups such as methyl, ethyl, propyl, butyl, hexyl, tetradecyl or octadecyl, aryl groups such as phenyl or tolyl, aralkyl groups such as benzyl or phenethyl, and halogen-substituted derivatives of these hydrocarbon groups such as chloromethyl, chloroethyl and chlorophenyl.

Examples of the hydrolyzable organic group represented by $Y_1$, $Y_2$ and $Y_3$ include alkoxy groups or alkoxyalkoxy groups, such as methoxy, ethoxy, butoxy and methoxyethoxy; acyloxy groups such as formyloxy, acetoxy or propionoxy; oxime groups such as $-ON=C(CH_3)_2$, $-ON=CHC_3H_7$ and $-ON=C(C_6H_5)_2$; and alkylamino or arylamino groups, such as $-NHCH_3$, $-NHC_2H_5$ and $-NH(C_6H_5)$.

Specific examples of the unsaturated silane compounds which can be used as modifying agents include vinyltrimethoxysilane, vinyltriethoxysilane and vinyltris(2-methoxyethoxy)silane.

Modification of polyolefins using such unsaturated silane compounds can be carried out by methods known per se, for example in accordance with the methods described in Japanese Patent Publication No. 1711/1973, and Japanese Laid-Open Patent Publication No. 28386/1979. For example, it can be carried out by kneading the polyolefin and the unsaturated silane compound with a radical generator such as dicumyl peroxide, tert.-butyl perpivalate, benzoyl peroxide, 2,5-dimethyl-2,5-di(tert.-butylperoxy)hexene-3 or 2,5-dimethyl-2,5-di(tert.-butylperoxy)hexyne-3 under heat or by mixing them in a hydrocarbon solvent at 80° to 200° C.

The proportion of the unsaturated silane compound to be grafted is generally $10^{-6}$ to $10^{-3}$ gram-equivalent, preferably $10^{-5}$ to $5\times10^{-4}$ gram-equivalent, more preferably $5\times10^{-5}$ to $3\times10^{-4}$ gram-equivalent, per gram of the modified polyolefin formed.

(A-4) Halogenated polyolefins

The halogenated polyolefins can be prepared in a customary manner, for example by contacting a solution or aqueous dispersion of the polyolefin with a halogenating agent such as chlorine, bromine, N-chlorosuccinimide or N-bromosuccinimide. Aliphatic hydrocarbons, alicyclic hydrocarbons, aromatic hydrocarbons and halogenated hydrocarbons may be used as solvents for the polyolefin. Halogenated hydrocarbons such as chlorobenzene or trichloroethane are preferred.

The concentration of the polyolefin in the solution or aqueous dispersion is not critical, but usually it is conveniently about 0.1 to 50% by weight. The halogenation may generally be carried out at a temperature of about 0° to about 200° C. for about 1 to about 20 hours.

Specific examples of such halogenated polyolefin include chlorinated polyethylene, chlorinated ethylene/propylene copolymer, chlorinated ethylene/1-butene copolymer, chlorinated ethylene/1-butene copolymer, chlorinated ethylene/4-methyl-1-pentene copolymer, chlorinated ethylene/1-octene copolymer, chlorinated polypropylene, chlorinated propylene/ethylene copolymer, and chlorinated propylene/1-butene copolymer. Further examples include chlorinated polybutene-1, chlorinated 1-butene/ethylene copolymer, chlorinated 1-butene/propylene copolymer, chlorinated poly(4-methyl-1-pentene), chlorinated 4-methyl-1-pentene/1-decene copolymer, brominated ethylene/propylene/diene rubber, brominated polypropylene, brominated polybutene-1 and brominated poly(4-methyl-1-pentene). Of these, the chlorinated polyolefins are preferred.

The halogen content of the halogenated polyolefin that can be used in the composition of this invention is desirably $0.3\times10^{-5}$ to $2\times10^{-2}$ gram-equivalent, preferably $0.84\times10^{-4}$ to $10^{-2}$ gram-equivalent, more preferably $2\times10^{-4}$ to $7\times10^{-3}$ gram-equivalent, per gram of the halogenated polyolefin.

(A-5) Hydroxyl group-containing polyolefins

The hydroxyl group-containing polyolefins can be prepared, for example, by copolymerizing the olefin with a monomer having a hydroxyl group or a precursor group capable of being changed to a hydroxyl group or by grafting the aforesaid monomer to the polyolefin. One typical example of the hydroxyl-containing polyolefin is a polymer obtained by saponifying an ethylene/vinyl acetate copolymer having an ethylene content of 30 to 99 mole% to a saponification degree of 10 to 100%.

Such hydroxyl group-containing polyolefins may contain the hydroxyl group in an amount of generally $3 \times 10^{-5}$ to $10^{-2}$ gram-equivalent, preferably $5 \times 10^{-5}$ to $8 \times 10^{-3}$ gram-equivalent, more preferably $10^{-4}$ to $6 \times 10^{-3}$ gram-equivalent, per gram of the polymer.

It has been found that the modified polyolefin (A) selected from the group consisting of the styrene-type hydrocarbon-modified polyolefins (A-1), the unsaturated epoxy compound-modified polyolefins (A-2), the unsaturated silane compound-modified polyolefins (A-3), the halogenated polyolefins (A-4), and the hydroxyl group-containing polyolefins (A-5) should have an intrinsic viscosity $[\eta]$ of 0.5 to 10 dl/g, preferably 0.8 to 7 dl/g, more preferably 1.0 to 5 dl/g, in order to provide a modified polyolefin composition having excellent adhesion as contemplated by the present invention.

In the present specification and the appended claims, the "intrinsic viscosity $[\eta]$" is a value measured at 135° C. in decalin as a solvent.

For the same reason, it is important that the modified polyolefin (a) should have a crystallinity of at least 20%. In the present specification and the appended claims, the "crystallinity" denotes a value measured by an X-ray diffraction method using a sample prepared by the method described in ASTM D-618. The modified polyolefin can have a crystallinity of preferably at least 25%, more preferably at least 35%.

Desirably, the modified polyolefin used in this invention has a relatively narrow molecular weight distribution. The molecular weight distribution is expressed by the ratio of its weight average molecular weight ($\overline{Mw}$) to its number average molecular weight ($\overline{Mn}$), i.e. ($\overline{Mw}/\overline{Mn}$). Advantageously, $\overline{Mw}/\overline{Mn}$ is generally from 1 to 30, preferably from 1 to 20, and more preferably from 1 to 15.

The weight average molecular weight $\overline{Mw}$ and the number average molecular weight $\overline{Mn}$ of the polymer are measured by the following procedure using gel permeation chromatography (GPC). 150 mg of the polymer, 100 ml of o-dichlorobenzene as a solvent and 0.04 g of 2,6-di-tert.-butyl-p-cresol as a stabilizer are mixed. The mixture is heated to 140° C. to dissolve the polymer. The solution is passed through a 0.2-micron filter to remove insoluble materials such as dirt and dust at 140° C. Then, the measurement is carried out by using a GPC measuring device (Model LC-GPC 150C of Waters Associates Inc.) and a column (Type TSKGMH6 of Toyo Soda Manufacturing Co., Ltd.) at a temperature of 135° C. and a flow rate of 1.0 ml/min. The numerical value is converted to a value based on polystyrene.

The thermoplastic polymer (B) to be blended with the modified polyolefin (A) may be (B-1) a thermoplastic polymer having a flexural modulus of at least 1000 kg/cm². These polymers will be described below in detail.

In the present specification and the appended claims, the "flexural modulus" is a value measured by the method described in ASTM D-790.

(B-1) Thermoplastic polymers having a flexural modulus of less than 1000 kg/cm²

It is important that the thermoplastic polymers used in this invention should have a glass transition temperature (Tg) of not more than 0° C., preferably −150° to 0° C., more preferably −130° to −20° C. In the present specification and the appended claims, the "glass transition temperature (Tg)" is measured by the method described in J. Applied Polymer Science, 1, 121 (1959).

It is also important that the thermoplastic polymers should have a weight average molecular weight ($\overline{Mw}$) of at least 400,000, preferably as high as at least 500,000, when it is measured by the GPC method as described hereinabove. When the above-mentioned soft polymer having a weight average molecular weight ($\overline{Mw}$) of less than 400,000 is blended with the modified polyolefin (A), an effect of increasing the adhesion strength to such a high level as is observed in the present invention cannot be obtained.

Desirably, the soft thermoplastic polymers (B-1) are rubbery elastomers having a flexural modulus of not more than 100 kg/cm², particularly not more than 50 kg/cm².

Specific examples of the soft thermoplastic polymers which can be used in this invention include polyisobutylene, polyhexene-1, polyoctene-1, ethylene/propylene copolymer rubber, ethylene/propylene/diene terpolymer, ethylene/1-butene copolymer rubber, propylene/ethylene copolymer rubber, 1-butene/ethylene copolymer rubber, polydecene-1, polydodecene-1, polyisoprene, butyl rubber and silicone rubber.

Desirably, these soft polymers have a crystallinity of generally not more than 30%, preferably not more than 25%, more preferably not more than 20%. Conveniently, their molecular weight distribution ($\overline{Mw}/\overline{Mn}$) is 1 to 30, preferably 1 to 20, more preferably 1 to 15.

Examples of the soft thermoplastic polymers (B-1) which can be used especially advantageously in this invention include polyisobutylene, polyisoprene, polyhexene-1, polyoctene-1, polydecene-1, ethylene/propylene copolymer rubber, ethylene/propylene/diene terpolymer, and butyl rubber.

(B-2) Thermoplastic polymers having a flexural modulus of at least 1000 kg/cm²

These polymers are selected from the group consisting of polar non-olefinic thermoplastic polymers (B-2-A) and ethylenic polymers (B-2-B) having an adhesion strength, with respect to the modified polyolefin to be blended, of not more than 200 g/cm, preferably not more than 80 g/cm, more preferably not more than 50 g/cm. The term "non-olefinic" means that the polymers do not substantially contain an olefin unit. The term "ethylenic polymers" means a homopolymer of ethylene or copolymers of ethylene having at least 50 mole% of an ethylene unit.

The "adhesion strength", used in the present specification and the appended claims, is measured by a T-peel testing method (pulling speed 100 mm/min., 23° C.) on a testing sample, 1 cm wide, cut off from a two-layer sheet (each layer having a thickness of 100 microns) which is obtained by co-extruding the two polymer components from two extruders into one T-die.

The term "polar", as used in the present specification and the appended claims, means the inclusion within molecular chains of a structural unit composed of chemical bonds other than C—H and C—C bonds. It should be understood that an aromatic ring skeleton is included within the definition of "polar".

The requirement of the adhesion strength stated above needs to be satisfied between a specific modified polyolefin (A) and a specific hard thermoplastic polymer (B-2) which have been selected for the preparation of the composition of this invention. The polymer (B-2) does not always satisfy the adhesion strength requirements with regard to all of the aforesaid modified polyolefins (A).

Specific examples of the polymers (B-2) include polystyrene; polyamides such as nylon-6, nylon-10, nylon-11, nylon-12, 6,6-nylon and 6,10-nylon; polyesters such as polyethylene terephthalate, polybutylene terephthalate, polyethylene terephthalate isophthalate, bisphenol A/terephthalic acid copolycondensate and ethylene glycol/cyclohexane dimethanol/terephthalic acid copolycondensate; polycarbonates such as polycarbonate of bisphenol A, polycarbonate of bisphenol F and polycarbonate of bisphenol AD; polyphenylene oxide polymers such as polyphenylene oxide, modified polyphenylene oxide and grafted polyphenylene oxide; acrylic polymers such as polymethyl methacrylate, polybutyl methacrylate, methyl methacrylate/butyl methacrylate copolymer, polyglycidyl methacrylate and polymethyl acrylate; styrene-type polymers such as polystyrene, poly-p-methylstyrene, poly-m-methylstyrene, high-impact polystyrene, styrene/acrylonitrile copolymer and styrene/methyl methacrylate copolymer; and ethylenic polymers such as polyethylene and ethylene/vinyl alcohol copolymer.

Advantageously, these polymers may have a flexural modulus of at least 1,500 kg/cm$^2$, preferably 2,000 to 50,000 kg/cm$^2$.

The polymers (B-1) and (B-2) may be used singly. Alternatively, at least two species selected from each of the polymers (B-1) or (B-2) may be used, or a combination of at least one species from the polymers (B-1) and at least one species from the polymers (B-2) may be used.

The polymer (B) may be present as a dispersed phase in a matrix of the modified polyolefin (A) in the composition of this invention. When two or more kinds of the polymers (B) are used, the dispersed phase may be composed of a mixture of the two or more polymers, or each dispersed phase may be composed of a single polymer. In the former case, the two or more polymers (B) are mixed in advance and blended with the modified polyolefin (A) by methods to be described below.

The composition of this invention can be prepared by blending and dispersing the thermoplastic polymer (B) with and in the modified polyolefin (A). The blending proportions of the modified polyolefin (A) and the polymer (B) may be within the following ranges provided that the total amount of (A) and (B) is 100 parts by weight.

| | Blending proportions (parts by weight) | | |
|---|---|---|---|
| | Broadest possible range | Preferred range | Most preferred range |
| Modified polyolefin (A) | 50–99 | 60–97 | 70–95 |
| Polymer (B) | 50–1 | 40–3 | 30–5 |

The polymer (B) may generally form a dispersed phase of fine particles in the matrix of the modified polyolefin (A). Desirably, the particle diameter of the dispersed phase of the polymer (B), as its average circle equivalent diameter (d), is generally in the range of 0.1 to 5 microns, preferably 0.3 to 4 microns, more preferably 0.5 to 3 microns. The "average circle equivalent diameter [d]" is an index introduced because the particles in the dispersed phase are not always completely spherical. It is determined in accordance with the following equation.

$$d = \frac{1}{n} \Sigma \sqrt{\frac{fi}{\pi}}$$

wherein n is the number of particles of the polymer (B) observed microscopically on the cross-section of the composition of this invention, and fi is the projected area of each of the particles.

The effect of improving the adhesion strength of this invention tends to be reduced when the dipsersed particles of the polymer (B) has a [d] smaller than 0.1 micron or larger than 5 microns.

In order to achieve the effect of this invention, the dispersed particles of the polymer (B) preferably should not be secondarily coagulated. For the polymer (B) to form dispersed particles in the matrix of the modified polyolefin (A), the compatibility between the polymer (B) and the modified polyolefin (A) is especially important. If the compatibility is very good, the aforesaid dispersed state does not result. Such a polymer (B) in combination with the modified polyolefin (A) cannot form a good composition intended by the present invention. In selecting the polymer (B), therefore, its compatibility with the modified polyolefin (A) should be considered.

Blending of the modified polyolefin (A) and the polymer (B) can be carried out by using polymer blending techniques known per se. Advantageously, the blending is carried out until the polymer (B) forms the aforesaid dispersed phase of particles in the modified polyolefin (A). For example, the modified polyolefin (A) and the polymer (B) are kneaded at a temperature above the highest melting point of the two but below 350° C. by means of an extruder, a kneader, a two-roll mill, a Banbury mixer, etc. Alternatively, the individual components are mixed in the form of a solution or suspension, and the polymers are precipitated from the mixture, or the mixture is dried. When in the preparation of the modified polyolefin (A), the modified polyolefin is not directly obtained by copolymerization, but by after-modification of an olefin, for example by a grafting reaction, there can be used a method in which a mixture of the aforesaid base polyolefin and the polymer (B) may be used as the base polyolefin to be subjected to the modification reaction. This method is industrially advantageous because it makes possible both mixing of the polymer (B) and the production of the modified polyolefin (A). The polymer (B) might also be modified in this case, but so long as the modified product meets the requirement of the polymer (B), there is no problem.

The composition of this invention can consist essentially of the modified polyolefin (A) and the polymer (B). If desired, it may further contain additives such as antioxidants, ultraviolet absorbers, antistatic agents, pigments, dyes, nucleating agents, fillers, slip agents, fire retardants, plasticizers, etc. which are used in ordinary polymeric substances in amounts which do not adversely affect the advantages of this invention. It may also contain polymeric substances other than the modified polyolefin (A) and the polymer (B).

The composition of this invention has especially good adhesion to polar substances as well as polyolefins, and can be advantageously used for producing laminates between the polar material and a polyolefin, or as an adhesive for bonding a plurality of polar substances. Examples of the polar substances include metals such as iron, copper, lead, nickel, zinc, and alloys of these metal elements such as stainless steel; concrete, wood, cellulose, natural fibers, and polar resins such as nylon, ethylene/vinyl alcohol copolymers, polyesters, polystyrene, polycarbonate, polyphenylene oxide, polyvinyl chloride, polyvinylidene chloride, polyacrylonitrile and ethylene/tetrafluoroethylene copolymer.

The composition of this invention may be bonded to a polar material by heating both of them to render at least the composition of the invention molten and then bonding them to each other. When the polar material is not thermoplastic, the molten composition of this invention may be laminated to the polar material, or the two are superimposed in advance and then bonded under heat melting. Or the composition of this invention is adhered to the polar material by electrostatic charge and then melt-laminated. There can also be used a method in which the polar material is heated to a temperature above the melting point of the composition of this invention, and the composition of this invention is adhered to it and simultaneously melted. When the polar material is thermoplastic, bonding can be effected by a method comprising melting both of the composition of this invention and the polar material and laminating them, or a method which comprises laminating the molten composition of the invention to the polar material. In bonding the composition of this invention and the polar material, it is not necessary to subject one or both surfaces of the polar material to such treatments as flaming treatment, corona discharge treatment or coating of a primer. If desired, such a pre-treatment may be performed.

Since the composition of this invention usually has good adhesion to polyolefins, it can be advantageously used as an interlayer in producing a laminate of a polar material and a polyolefin.

The composition of this invention can be used in many applications, for example laminated films, laminated sheets, laminated bottles, rust-proof coatings of metal plates or pipes, hot-melt adhesives, paint film-forming elements.

The composition of this invention has improved adhesion to polar materials while retaining the other excellent properties of the modified polyolefin improved by modification.

The following examples illustrate the present invention in greater detail. It should be understood that the present invention should not be limited to these examples unless it departs from its scope.

EXAMPLE 1

An ethylene/1-butene copolymer having a density of 0.930 g/cm$^3$ was kneaded with a styrene monomer and 2,5-dimethyl-2,5-di(tert.-butylperoxy)hexyne-3 in an extruder set at a temperature of 230° C. to prepare a styrene-grafted ethylene/1-butene copolymer (to be referred to as modified product A-1). The content of the styrene unit grafted was $1.7 \times 10^{-4}$ gram-equivalent/g. The modified product A-1 had an intrinsic viscosity of 1.18 dl/g and a crystallinity of 60%.

Ninety parts by weight of the modified product A-1 was mixed with 10 parts by weight of polyhexene-1 having a flexural modulus of less than 500 kg/cm$^2$, a weight average molecular weight of 550,000 and a glass transition temperature of $-50°$ C., and they were kneaded in an extruder set at a temperature of 230° C. to prepare a composition (C-1).

Into a three-layer manifold T-die sheet forming machine set at a die temperature of 200° C. were fed high-impact polystyrene (TOPOREX HI-830-05, a product of Mitsui Toatsu Chemicals, Inc.) as an outside layer I, the composition C-1 as an interlayer and medium-density polyethylene (Neozex 3511F, a product of Mitsui Petrochemical Industries, Ltd.) as an outside layer II from two extruders. Thus, a three-layer sheet composed of high-impact polystyrene (100 microns)/composition C-1 (50 microns)/medium-density polyethylene (100 microns) was prepared.

A test sample having a width of 100 mm was cut off from the three-layer sheet, and the peel strength between the high-impact polystyrene layer and the composition C-1 layer and the peel strength between the medium-density polyolefin layer and the composition C-1 layer were measured.

The peel strengths were measured by peeling the outer polymer layer (II) and the intermediate 100 micron thick polymer layer by 180 degrees at a rate of 50 mm/min. and a temperature of 23° C.

The results are summarized in Table 1.

EXAMPLES 2 AND 3

A three-layer sheet was prepared in the same way as in Example 1 except that polyvinylidene chloride (Saran, a product of Dow Chemical Company) or polyethylene terephthalate (J145, a product of Toray Inc.) was used as the outside layer I instead of polystyrene, an acrylonitrile copolymer (BAREX, a product of Vistron Company) or polycarbonate (Panlite L-1250, a product of Teijin Chemical Co., Ltd.) was used as the outside layer II, and the manifold die was set at a temperature of 200° C. or 280° C. The peel strengths of the sheets are summarized in Table 1.

EXAMPLES 4 TO 6

A vinylmethoxysilane-grafted ethylene/1-butene copolymer was prepared in the same way as in Example 1 except that vinyltrimethoxysilane was used as the grafting monomer. The modified copolymer (to be referred to as modified product A-2) contained $0.88 \times 10^{-4}$ gram-equivalent/g of the vinyltrimethoxysilane unit, and had an intrinsic viscosity of 1.19 dl/g and a crystallinity of 59%.

Ninety parts by weight of the modified product A-2 was mixed with 10 parts by weight of the same polyhexene-1 as used in Example 1, and they were kneaded to prepare a composition (C-2).

A three-layer sheet was prepared in the same way as in Example 1 except that polyvinylidene chloride, polyethylene terephthalate or polycarbonate used in Example 2 or 3 was used as the outside layer I, the manifold die was set at a temperature of 200 (Example 4), 280 (Example 5) or 280 (Example 6) °C., and the composition C-2 was used as the interlayer.

The peel strengths of the sheet are summarized in Table 1.

EXAMPLES 7 TO 11

The same ethylene/1-butene copolymer as used in Example 1 was dissolved in p-xylene and subjected to grafting reaction at 125° C. using glycidyl methacrylate as a modifying monomer and dicumyl peroxide as an initiator. The reaction mixture was cooled to room temperature, and a large amount of acetone was added. The precipitate was collected by filtration. The precipitated polymer was repeatedly washed with acetone, and dried under vacuum. The modified copolymer (referred to as modified product A-3) contained $1.1 \times 10^{-4}$ gram-equivalent/g of the glycidyl methacrylate unit and had an intrinsic viscosity of 1.21 dl/g and a crystallinity of 58%. The modified product A-3 was mixed with 10% by weight of polyisobutylene having a flexural modulus of less than 500 kg/cm$^2$, a weight average molecular weight of 650,000 and a glass transition temperature of $-65°$ C., and they were kneaded to prepare a composition (C-3).

A three-layer sheet was prepared in the same way as in Example 1 except that polyvinylidene chloride, polyethylene terephthalate, polycarbonate or acrylonitrile copolymer used in Example 2 or 3 or an ethylene/tetrafluoroethylene copolymer (AFLON, a product of Asahi Glass Co., Ltd.) was used as the outside layer I, the composition C-3 was used as the interlayer, and the manifold die was set at the same temperature as in Example 2 to 9 depending upon the kind of the outside layer I, or when the outside layer I was the ethylene/tetrafluoroethylene copolymer, the die was set at a temperature of 300° C. The peel strengths are summarized in Table 1.

EXAMPLES 12 TO 15

The same ethylene/1-butene copolymer as used in Example 1 was dissolved in chlorobenzene at 110° C., and chlorinated by blowing chlorine gas into the solution. The reaction mixture was cooled to room temperature. A large amount of methanol was added to precipitate the polymer. The precipitate was collected by filtration, repeatedy washed with methanol, and dried in vacuum to obtain a chlorinated ethylene/1-butene copolymer which had a chlorine content of $1.1 \times 10^{-3}$ gram-equivalent/g, an intrinsic viscosity of 1.12 dl/g and a crystallinity of 48% (the chlorinated polymer is referred to as modified product A-4). The modified product A-4 was kneaded with 10% by weight of the same polyisobutylene as used in Example 7 and 1% by weight of epoxidized soybean oil to form a composition (C-4).

A three-layer sheet was prepared in the same way as in Example 1 except that the polystyrene, polyvinylidene chloride, polyethylene terephthalate or polycarbonate used in Examples 1 to 11 was used as the outside layer I, the manifold die was set at the same temperatures as in Examples 1 to 11 depending upon the kind of the outside layer I, and the composition C-4 was used as the interlayer.

The peel strengths are summarized in Table 2.

EXAMPLES 16 TO 25

The three-layer sheets shown in Table 2 were prepared in the same way as in Example 1 using the compositions or outside layer polymers shown in Table 2. The properties of the sheets are shown in Table 2.

COMPARATIVE EXAMPLES 1 TO 14

The three-layer sheets shown in Table 3 were prepared in the same way as in Example 1 using the compositions or outside layer polymers shown in Table 3. The properties of the sheets are shown in Table 3.

EXAMPLES 26 TO 28 AND COMPARATIVE EXAMPLES 15 TO 17

The compositions shown in Table 4 were prepared by using the ethylene copolymers indicated in Table 4 as a polyolefin having a polar group, and by laminating the resulting compositions and the outside layer polymers shown in Table 4, three-layer sheets were prepared.

The properties of the three-layer sheets are shown in Table 4.

TABLE 1

| | Example 1 | Example 2 | Example 3 | Example 4 | Example 5 | Example 6 |
|---|---|---|---|---|---|---|
| Composition used as the interlayer | | | | | | |
| Modified polyolefin (A) | | | | | | |
| Modified product No. | A-1 | A-1 | A-1 | A-2 | A-2 | A-2 |
| Base polyolefin | Ethylene/1-butene copolymer | Ethylene/1-butene copolymer | Ethylene/1-butene copolymer | Ethylene/1-butene copolymer | Ethylene/1-butene copolymer | Ethylene/1-butene copolymer |
| Density (g/cc) of the base polyolefin | 0.930 | 0.930 | 0.930 | 0.930 | 0.930 | 0.930 |
| Modifier | Styrene | Styrene | Styrene | Vinyltrimethoxysilane | Vinyltrimethoxysilane | Vinyltrimethoxysilane |
| Content (g-equivalent/g) of the modifier | $1.7 \times 10^{-4}$ | $1.7 \times 10^{-4}$ | $1.7 \times 10^{-4}$ | $0.88 \times 10^{-4}$ | $0.88 \times 10^{-4}$ | $0.88 \times 10^{-4}$ |
| [η] (dl/g) | 1.18 | 1.18 | 1.18 | 1.19 | 1.19 | 1.19 |
| Crystallinity (%) | 60 | 60 | 60 | 59 | 59 | 59 |
| $\overline{Mw}/\overline{Mn}$ | 8.2 | 8.2 | 8.2 | 8.5 | 8.5 | 8.5 |
| Polymer (B) | | | | | | |
| Name | Polyhexene-1 | Polyhexene-1 | Polyhexene-1 | Polyhexene-1 | Polyhexene-1 | Polyhexene-1 |
| Type | Elastomer (soft) | Elastomer (soft) | Elastomer (soft) | Elastomer (soft) | Elastomer (soft) | Elastomer (soft) |
| $\overline{Mw}$ | 550,000 | 550,000 | 550,000 | 550,000 | 550,000 | 550,000 |
| Tg (°C) | −50 | −50 | −50 | −50 | −50 | −50 |
| Flexural modulus (kg/cm²) | less than 500 | less than 500 | less than 500 | less than 500 | less than 500 | less than 500 |
| Strength of adhesion to the modified product (g/cm) | — | — | — | — | — | — |
| Method of addition | After-blending | After-blending | After-blending | After-blending | After-blending | After-blending |
| Amount added (% by weight) | 10 | 10 | 10 | 10 | 10 | 10 |
| $\overline{Mw}/\overline{Mn}$ | 5.8 | 5.8 | 5.8 | 5.8 | 5.8 | 5.8 |
| Crystallinity (%) | 0 | 0 | 0 | 0 | 0 | 0 |
| Composition | | | | | | |
| No. | C-1 | C-1 | C-1 | C-2 | C-2 | C-2 |
| Average diameter of the dispersed particles (microns) | 1-2 | 1-2 | 1-2 | 1-2 | 1-2 | 1-2 |
| Three-layer sheet | | | | | | |
| Polymer of the outside layer I | High-impact polystyrene | Polyvinylidene chloride Acrylonitrile copolymer | Polyethylene terephthalate Polycarbonate | Polyvinylidene chloride | Polyethylene terephthalate | Polycarbonate |
| Polymer of the outside layer II | Medium-density polyethylene | — | — | Medium-density polyethylene | Medium-density polyethylene | Medium-density polyethylene |
| Peel strength with respect to the outside layer I (g/cm) | 1100 | 900 | 980 | 520 | 610 | 1000 |
| Peel strength with respect to the outside layer II (g/cm) | Peeling impossible | Peeling impossible | Peeling impossible | Peeling impossible | Peeling impossible | Peeling impossible |

| | Example 7 | Example 8 | Example 9 | Example 10 | Example 11 |
|---|---|---|---|---|---|
| Composition used as the interlayer | | | | | |
| Modified polyolefin (A) | | | | | |
| Modified product No. | A-3 | A-3 | A-3 | A-3 | A-3 |
| Base polyolefin | Ethylene/1-butene copolymer | Ethylene/1-butene copolymer | Ethylene/1-butene copolymer | Ethylene/1-butene copolymer | Ethylene/1-butene copolymer |
| Density (g/cc) of the base polyolefin | 0.930 | 0.930 | 0.930 | 0.930 | 0.930 |
| Modifier | Glycidyl methacrylate | Glycidyl methacrylate | Glycidyl methacrylate | Glycidyl methacrylate | Glycidyl methacrylate |
| Content (g-equivalent/g) of the modifier | $1.1 \times 10^{-4}$ | $1.1 \times 10^{-4}$ | $1.1 \times 10^{-4}$ | $1.1 \times 10^{-4}$ | $1.1 \times 10^{-4}$ |
| [η] (dl/g) | 1.21 | 1.21 | 1.21 | 1.21 | 1.21 |
| Crystallinity (%) | 58 | 58 | 58 | 58 | 58 |
| $\overline{Mw}/\overline{Mn}$ | 7.2 | 7.2 | 7.2 | 7.2 | 7.2 |

TABLE 1-continued

| Polymer (B) | | | | | | |
|---|---|---|---|---|---|---|
| Name | Polyisobutylene | Polyisobutylene | Polyisobutylene | Polyisobutylene | Polyisobutylene | Polyisobutylene |
| Type | Elastomer (soft) | Elastomer (soft) | Elastomer (soft) | Elastomer (soft) | Elastomer (soft) | Elastomer (soft) |
| Mw | 650,000 | 650,000 | 650,000 | 650,000 | 650,000 | 650,000 |
| Tg (°C) | −63 | −63 | −63 | −63 | −63 | −63 |
| Flexural modulus (kg/cm²) | less than 500 | less than 500 | less than 500 | less than 500 | less than 500 | less than 500 |
| Strength of adhesion to the modified product (g/cm) | — | — | — | — | — | — |
| Method of addition | After-blending | After-blending | After-blending | After-blending | After-blending | After-blending |
| Amount added (% by weight) | 10 | 10 | 10 | 10 | 10 | 10 |
| Mw/Mn | 4.9 | 4.9 | 4.9 | 4.9 | 4.9 | 4.9 |
| Crystallinity (%) | 0 | 0 | 0 | 0 | 0 | 0 |
| Composition | | | | | | |
| No. | C-3 | C-3 | C-3 | C-3 | C-3 | C-3 |
| Average diameter of the dispersed particles (microns) | 1-2 | 1-2 | 1-2 | 1-2 | 1-2 | 1-2 |
| Three-layer sheet | | | | | | |
| Polymer of the outside layer I | Polyvinylidene chloride | Polyethylene terephthalate | Polycarbonate | Acrylonitrile copolymer | Ethylene/tetrafluoro-ethylene copolymer |  |
| Polymer of the outside layer II | Medium-density polyethylene | Medium-density polyethylene | Medium-density polyethylene | Medium-density polyethylene | Medium-density polyethylene |  |
| Peel strength with respect to the outside layer I (g/cm) | 980 | 1200 | 1500 | 1800 | 1200 |  |
| Peel strength with respect to the outside layer II (g/cm) | Peeling impossible | Peeling impossible | Peeling impossible | Peeling impossible | Peeling impossible |  |

TABLE 2

| | Example 12 | Example 13 | Example 14 | Example 15 | Example 16 | Example 17 | Example 18 |
|---|---|---|---|---|---|---|---|
| Composition used as the interlayer | | | | | | | |
| Modified polyolefin (A) | | | | | | | |
| Modified product No. | A-4 | A-4 | A-4 | A-4 | A-1 | A-3 | A-1 |
| Base polyolefin | Ethylene/1-butene copolymer | Ethylene/1-butene copolymer | Ethylene/1-butene copolymer | Ethylene/1-butene copolymer | Ethylene/1-butene copolymer | Ethylene/1-butene copolymer | Ethylene/1-butene copolymer |
| Density (g/cc) of the base polyolefin | 0.930 | 0.930 | 0.930 | 0.930 | 0.930 | 0.930 | 0.930 |
| Modifier | Chlorine gas | Chlorine gas | Chlorine gas | Chlorine gas | Styrene | Glycidyl methacrylate | Styrene |
| Content (g-equivalent/g) of the modifier | $3.9 \times 10^{-3}$ | $3.9 \times 10^{-3}$ | $3.9 \times 10^{-3}$ | $3.9 \times 10^{-3}$ | $1.7 \times 10^{-4}$ | $1.1 \times 10^{-4}$ | $1.7 \times 10^{-4}$ |
| $[\eta]$ (dl/g) | 1.12 | 1.12 | 1.12 | 1.12 | 1.18 | 1.21 | 1.18 |
| Crystallinity (%) | 48 | 48 | 48 | 48 | 60 | 58 | 50 |
| $\overline{Mw}/\overline{Mn}$ | 7.3 | 7.3 | 7.3 | 7.3 | 8.2 | 7.2 | 8.2 |
| Polymer (B) | | | | | | | |
| Name | Polyisobutylene | Polyisobutylene | Polyisobutylene | Polyisobutylene | Nylon 6 | Polystyrene | Polyisobutylene** |
| Type | Elastomer (soft) | Elastomer (soft) | Elastomer (soft) | Elastomer (soft) | Plastic (hard) | Plastic (hard) | Elastomer (soft) |
| Mw | 650,000 | 650,000 | 650,000 | 650,000 | — | — | 800,000 |
| Tg (°C.) | −63 | −63 | −63 | −63 | — | — | −65 |
| Flexural modulus (kg/cm²) | less than 500 | less than 500 | less than 500 | less than 500 | 22,000 | 37,000 | less than 500 |
| Strength of adhesion to the modified product (g/cm) | — | — | — | — | 20 | 20 | — |
| Method of addition | After-blending | After-blending | After-blending | After-blending | After-blending | After-blending | Blending before modification |
| Amount added (% by weight) | 10 | 10 | 10 | 10 | 10 | 10 | 10 |
| $\overline{Mw}/\overline{Mn}$ | 4.9 | 4.9 | 4.9 | 4.9 | — | — | 5.2 |
| Crystallinity (%) | 0 | 0 | 0 | 0 | — | — | 0 |
| Composition | | | | | | | |
| No. | C-4 | C-4 | C-4 | C-4 | C-5 | C-6 | C-7 |
| Average diameter of the dispersed particles (microns) | 2 | 2 | 2 | 2 | 5 | 1–3 | 1–3 |
| Three-layer sheet | | | | | | | |
| Polymer of the outside layer I | High-impact polystyrene | Polyvinylidene chloride | Polyethylene terephthalate | Polycarbonate | Polyethylene terephthalate | Acrylonitrile copolymer | High-impact polystyrene |
| Polymer of the outside layer II | Medium-density polyethylene | Medium-density polyethylene | Medium density polyethylene | Medium-density polyethylene | Medium-density polyethylene | Medium-density polyethylene | Medium-density polyethylene |
| Peel strength with respect to the outside layer I (g/cm) | 1500 | 1900 | 1080 | 2150 | 880 | 1600 | 1050 |
| Peel strength with respect to the outside layer II (g/cm) | Peeling impossible | Peeling impossible | Peeling impossible | Peeling impossible | Peeling impossible | Peeling impossible | Peeling impossible |

| | Example 19 | Example 20 | Example 21 | Example 22 | Example 23 | Example 24 | Example 25 |
|---|---|---|---|---|---|---|---|
| Composition used as the interlayer | | | | | | | |
| Modified polyolefin (A) | | | | | | | |
| Modified product No. | A-5 | A-6 | A-7 | A-8 | A-9 | A-10 | A-1 |
| Base polyolefin | Polypropylene | Poly(4-methyl-1-pentene) | Ethylene/4-methyl-1-pentene copolymer | Ethylene/1-butene copolymer | Polypropylene | Polypropylene | Ethylene/1-butene copolymer |
| Density (g/cc) of the base polyolefin | 0.91 | 0.83 | 0.950 | 0.90 | 0.91 | 0.91 | 0.930 |
| Modifier | Styrene | Styrene | Styrene | Styrene | Styrene | Styrene | Styrene |
| Content (g-equivalent/g) of the modifier | $2.2 \times 10^{-4}$ | $2.4 \times 10^{-4}$ | $1.8 \times 10^{-4}$ | $2.4 \times 10^{-4}$ | $2.2 \times 10^{-4}$ | $2.2 \times 10^{-4}$ | $1.7 \times 10^{-4}$ |
| $[\eta]$ (dl/g) | 1.48 | 1.12 | 1.61 | 2.52 | 1.48 | 1.48 | 1.18 |
| Crystallinity (%) | 55 | 35 | 52 | 25 | 55 | 55 | 60 |

TABLE 2-continued

| Mw/Mn Polymer (B) | 6.8 | 7.3 | 6.9 | 3.8 | 6.8 | 6.8 | 8.2 |
|---|---|---|---|---|---|---|---|
| Name | Polyhexene-1 | Polyisobutylene | Polyisobutylene | Polyisobutylene | Polyhexene-1 | Low-density | Ethylene/propylene copolymer |
| Type | Elastomer (soft) | Elastomer (soft) | Elastomer (soft) | Elastomer (soft) | Elastomer (soft) | Plastic (hard) | Elastomer (soft) |
| Mw | 1,000,000 | 450,000 | 450,000 | 450,000 | 550,000 | 2500 | 450,000 |
| Tg (°C.) | −50 | −60 | −65 | −65 | −50 | — | −44 |
| Flexural modulus (kg/cm²) | less than 500 | less than 500 | less than 500 | less than 500 | less than 500 | 1500 | less than 500 |
| Strength of adhesion to the modified product (g/cm) | — | — | — | — | — | 40 | — |
| Method of addition | After-blending | After-blending | After-blending | After-blending | After-blending | After-blending | After-blending |
| Amount added (% by weight) | 10 | — | 10 | 5 | 30 | 10 | 10 |
| Mw/Mn | 6.3 | 5.2 | 5.2 | 5.2 | 5.8 | — | 4.2 |
| Crystallinity (%) | 0 | 0 | 0 | 0 | 0 | — | 15 |
| Composition | | | | | | | |
| No. | C-8 | C-9 | C-10 | C-11 | C-12 | C-13 | C-14 |
| Average diameter of the dispersed particles (microns) | 2-4 | 0.5-2 | 2-4 | 0.5-2 | 0.5-4 | 0.5-2 | 0.15 |
| Three-layer sheet | | | | | | | |
| Polymer of the outside layer I | Polyvinylidene chloride | Polycarbonate | Polyethylene terephthalate | Polyethylene terephthalate | Polycarbonate | Polyvinylidene chloride | Polyethylene terephthalate |
| Polymer of the outside layer II | Polypropylene | Poly(4-methyl-1-pentene) | Medium-density polyethylene | Medium-density polyethylene | Polypropylene | Polypropylene | Polycarbonate |
| Peel strength with respect to the outside layer I (g/cm) | 900 | 810 | 880 | 980 | 800 | 820 | 830 |
| Peel strength with respect to the outside layer II (g/cm) | Peeling impossible | Peeling impossible | Peeling impossible | Peeling impossible | Peeling impossible | Peeling impossible | 900 |

**Partly containing a styrene-grafted product

TABLE 3

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Composition used as the interlayer | | | | | | | |
| Modified polyolefin (A) | | | | | | | |
| Modified product No. | A-1 | A-1 | A-1 | A-1 | A-1 | A-1 | A-1 |
| Base polyolefin | Ethylene/1-butene copolymer | Ethylene/1-butene copolymer | Ethylene/1-butene copolymer | Ethylene/1-butene copolymer | Ethylene/1-butene copolymer | Ethylene/1-butene copolymer | Ethylene/1-butene copolymer |
| Density (g/cc) of the base polyolefin | 0.930 | 0.930 | 0.930 | 0.930 | 0.930 | 0.930 | 0.930 |
| Modifier | Styrene | Styrene | Styrene | Styrene | Styrene | Styrene | Styrene |
| Content (g-equivalent/g) of the modifier | $1.7 \times 10^{-4}$ | $1.7 \times 10^{-4}$ | $1.7 \times 10^{-4}$ | $1.7 \times 10^{-4}$ | $1.7 \times 10^{-4}$ | $1.7 \times 10^{-4}$ | $1.7 \times 10^{-4}$ |
| [η] (dl/g) | 1.18 | 1.18 | 1.18 | 1.18 | 1.18 | 1.18 | 1.18 |
| Crystallinity (%) | 60 | 60 | 60 | 60 | 60 | 60 | 60 |
| Mw/Mn | 8.2 | 8.2 | 8.2 | 8.2 | 8.2 | 8.2 | 8.2 |
| Polymer (B) | | | | | | | |
| Name | — | — | — | Polyhexene-1 | Polyhexene-1 | Polystyrene | Ethylene/propylene copolymer |
| Type | — | — | — | Elastomer (soft) | Elastomer (soft) | Plastic (hard) | Elastomer |
| Mw | — | — | — | 100,000 | 100,000 | 22,000 | 200,000 |
| Tg (°C) | — | — | — | −50 | −50 | — | −45 |
| Flexural modulus (kg/cm²) | — | — | — | less than 500 | less than 500 | 350 | less than 500 |
| Strength of adhesion to the modified product (g/cm) | — | — | — | — | — | — | — |
| Method of addition | — | — | — | After-blending | After-blending | After-blending | After-blending |
| Amount added (% by weight) | — | — | — | 10 | 7.0 | 10 | 10 |
| Mw/Mn | — | — | — | 4.6 | 4.6 | — | 3.8 |
| Crystallinity (%) | — | — | — | 0 | 0 | — | 15 |
| Composition | | | | | | | |
| No. | C-15 | C-16 | C-16 | C-17 | C-18 | C-19 | C-20 |
| Average diameter of the dispersed particles (microns) | — | — | — | 0.5–1 | 5–10 | 0.5–2 | less than 0.1 |
| Three-layer sheet | | | | | | | |
| Polymer of the outside layer I | High-impact polystyrene | Polyvinylidene chloride Acrylonitrile copolymer | Polyethylene terephthalate | Polyethylene terephthalate | Polyethylene terephthalate | Polyethylene terephthalate | Polyethylene terephthalate |
| Polymer of the outside layer II | Medium-density polyethylene | 0.88 | Polycarbonate | Polycarbonate | Polycarbonate | Polycarbonate | Polycarbonate |
| Peel strength with respect to the outside layer I (g/cm) | 400 | 410 | 380 | 420 | 370 | 400 | 420 |
| Peel strength with respect to the outside layer II (g/cm) | Peeling impossible | 300 | 410 | 410 | 700 | Peeling impossible | Peeling impossible |

| | Comparative Example 8 | Comparative Example 9 | Comparative Example 10 | Comparative Example 11 | Comparative Example 12 | Comparative Example 13 | Comparative Example 14 |
|---|---|---|---|---|---|---|---|
| Composition used as the interlayer | | | | | | | |
| Modified polyolefin (A) | | | | | | | |
| Modified product No. | A-10 | A-10 | A-2 | A-3 | A-4 | A-5 | A-1 |
| Base polyolefin | Ethylene/1-butene copolymer | Ethylene/1-butene copolymer | Ethylene/1-butene copolymer | Ethylene/1-butene copolymer | Ethylene/1-butene copolymer | Polypropylene | Ethylene/1-butene copolymer |
| Density (g/cc) of the base polyolefin | 0.88 | 0.88 | 0.930 | 0.930 | 0.930 | 0.91 | 0.930 |
| Modifier | Styrene | Styrene | Vinyltrimethoxy-silane | Glycidyl methacrylate | Chlorine gas | Styrene | Styrene |
| Content (g-equivalent/g) of the modifier | $1.8 \times 10^{-4}$ | $1.8 \times 10^{-4}$ | $0.88 \times 10^{-4}$ | $1.1 \times 10^{-4}$ | $3.9 \times 10^{-3}$ | $2.2 \times 10^{-4}$ | $1.7 \times 10^{-4}$ |

TABLE 3-continued

| | | | | | | | |
|---|---|---|---|---|---|---|---|
| [η] (dl/g) | 1.45 | 1.45 | 1.19 | 1.21 | 1.12 | 1.48 | 1.18 |
| Crystallinity (%) | 13 | 13 | 59 | 58 | 52 | 55 | 60 |
| Mw/Mn | 3.5 | 3.5 | 8.5 | 7.2 | 7.3 | 6.8 | 8.2 |
| Polymer (B) | | | | | | | |
| Name | Polyisobutylene | — | — | — | — | — | Ethylene/1-butene copolymer Plastic (hard) |
| Type | Elastomer (soft) | — | — | — | — | — | — |
| Mw | 600,000 | — | — | — | — | — | 2500 |
| Tg (°C.) | −65 | — | — | — | — | — | 1000 |
| Flexural modulus (kg/cm²) | less than 500 | — | — | — | — | — | |
| Strength of adhesion to the modified product (g/cm) | — | — | — | — | — | — | — |
| Method of addition | After-blending | — | — | — | — | — | After-blending |
| Amount added (% by weight) | 10 | — | — | — | — | — | 10 |
| Mw/Mn | 5.3 | — | — | — | — | — | — |
| Crystallinity (%) | 0 | — | — | — | — | — | — |
| Composition | | | | | | | |
| No. | C-21 | C-22 | C-23 | C-24 | C-25 | C-26 | C-27 |
| Average diameter of the dispersed particles (microns) | 0.5–2 | — | — | — | — | — | 0.1–0.5 |
| Three-layer sheet | | | | | | | |
| Polymer of the outside layer I | High-impact polystyrene | High-impact polystyrene | Polyvinylidene chloride | Polyvinylidene chloride | High-impact polystyrene | Polyvinylidene chloride | High-impact polystyrene |
| Polymer of the outside layer II | Medium-density polyethylene 550 | Medium-density polyethylene 550 | Medium-density polyethylene 250 | Medium-density polystyrene 300 | Medium-density polystyrene 580 | Polypropylene 300 | Medium-density polystyrene 410 |
| Peel strength with respect to the outside layer I (g/cm) | Peeling impossible | Peeling impossible | Peeling impossible | Peeling impossible | Peeling impossible | Peeling impossible | Peeling impossible |
| Peel strength with respect to the outside layer II (g/cm) | Peeling impossible | Peeling impossible | Peeling impossible | Peeling impossible | Peeling impossible | Peeling impossible | Peeling impossible |

TABLE 4

| | Example 26 | Comparative Example 15 | Example 27 | Comparative Example 16 | Example 28 | Comparative Example 17 |
|---|---|---|---|---|---|---|
| Composition used as the interlayer | | | | | | |
| Polar group-containing ethylene copolymer (A) | | | | | | |
| Polar monomer 1 | Glycidyl methacrylate | Glycidyl methacrylate | Vinyl acetate | Vinyl chloride | Vinyl acetate | Vinyl chloride |
| Content (g-equivalent/g) of polar monomer 1 | $2.7 \times 10^{-4}$ | $2.7 \times 10^{-4}$ | $1.7 \times 10^{-3}$ | $1.7 \times 10^{-3}$ | $1.4 \times 10^{-3}$ | $1.4 \times 10^{-3}$ |
| Polar monomer 2 | Ethyl acrylate | Ethyl acrylate | None | None | Vinyl alcohol | Vinyl alcohol |
| Content (g-equivalent/g) of polar monomer 2 | $5.0 \times 10^{-4}$ | $5.0 \times 10^{-4}$ | — | — | $1.4 \times 10^{-3}$ | $1.4 \times 10^{-3}$ |
| $[\eta]$ (dl/g) | 1.43 | 1.43 | 1.03 | 1.03 | 0.85 | 0.85 |
| Crystallinity (%) | 50 | 50 | 40 | 40 | 25 | 25 |
| Mw/Mn | 16 | 16 | 16 | 16 | 18 | 18 |
| Polymer (B) | | | | | | |
| Name | Polyisoprene | — | Polyisobutylene | — | Polyisobutylene | — |
| Type | Elastomer (soft) | — | Elastomer (soft) | — | Elastomer (soft) | — |
| Mw | 800,000 | — | 800,000 | — | 800,000 | — |
| Tg (°C.) | −65 | — | −65 | — | −65 | — |
| Flexural modulus (kg/cm²) | less than 500 | — | less than 500 | — | less than 500 | — |
| Strength of adhesion to the above copolymer (g/cm) | — | — | — | — | — | — |
| Method of addition | After-blending | — | After-blending | — | After-blending | — |
| Amount added (% by weight) | 10 | — | 10 | — | 10 | — |
| Mw/Mn | 5.2 | — | 5.2 | — | 5.2 | — |
| Crystallinity (%) | 0 | — | 0 | — | 0 | — |
| Composition | | | | | | |
| No. | C-28 | C-31 | C-29 | C-32 | C-30 | C-33 |
| Average diameter of the dispersed particles (microns) | 0.5–2 | — | 0.5–2 | — | 1–2 | — |
| Three-layer sheet | | | | | | |
| Polymer of the outside layer I | Polyethylene terephthalate | Polyethylene terephthalate | Polyvinylidene chloride | Polyvinylidene chloride | Polyethylene terephthalate | Polyethylene terephthalate |
| Polymer of the outside layer II | Polyvinylidene chloride | Polyvinylidene chloride | High-impact polystyrene | High-impact polystyrene | Ethylene/vinyl alcohol copolymer | Ethylene/vinyl alcohol copolymer |
| Peel strength with respect to the outside layer I (g/cm) | 1300 | 400 | 1100 | 500 | 1760 | 500 |
| Peel strength with respect to the outside layer II (g/cm) | 1190 | 410 | 800 | 200 | 750 | 190 |

EXAMPLES 29 AND 30 AND COMPARATIVE EXAMPLE 18

By using the compositions C-3 and C-6 used in Examples 7 and 17 and the composition C-24 used in Comparative Example 11 as an adhesive layer, two-layer coextrusion coating was carried out on a 1-inch steel pipe (JIS No. SGP) which had been degreased and pickled. The thickness of the adhesive layer was 100 microns and the thickness of high-density polystyrene (Hizex 5100E, a product of Mitsui Petrochemical Industries, Ltd.) on it was adjusted to 2 mm.

The temperature at which the steel pipe was preheated was 200° C., and the temperature of the extruded resins was 230° C.

The coated pipe was cooled with water, and a test sample having a width of 10 mm was cut off from it. The peel strength between the steel and the composition layer was measured at a peeling angle of 90°.

The delamination strength was 17, 16 and 5 kg/cm, respectively. The overcoated high-density polyethylene could not be peeled from the adhesive layer.

COMPARATIVE EXAMPLE 19

A composition C-34 in which the dispersed particles had an average diameter of 1 to 3 microns was prepared in the same way as in Example 1 except that 10% by weight of polypropylene (flexural modulus 15000 kg/cm², the adhesion strength with respect to the modified product A-1 250 g/cm) was added instead of polyhexene-1 to the modified product A-1.

A laminate with high-impact polystyrene was prepared in the same way as in Example 1 except that the composition C-34 was used as an interlayer.

The peel strength between the interlayer and the outer layer I (high-impact polysrtyrene) was 580 g/cm, and the outerlayer II (medium-density polyethylene) could not be peeled from the interlayer.

The results of the foregoing examples show that by using the composition of this invention as an adhesive layer, the peel strength was increased to two times or more.

What is claimed is:

1. A modified polyolefin composition having good adhesion to both polar substances and polyolefins comprising (A) 50 to 99 parts by weight of a modified polyolefin having an intrinsic viscosity ($\eta$) of 0.5 to 10 dl/g and a degree of crystallization of at least 20% selected from the group consisting of polyolefins modified with styrene hydrocarbons, polyolefins modified with unsaturated epoxy compounds, polyolefins modified with unsaturated silane compounds, halogenated polyolefins and hydroxyl group-containing polyolefins, wherein the polyolefins modified with styrene hydrocarbons are styrene hydrocarbon-grafted polyolefins produced by reacting a polyolefin and a styrene hydrocarbon in the heat-molten state or in the form of a solution in the presence of a radical initiator, and (B) 1 to 50 parts by weight of a thermoplastic polymer selected from the group consisting of polyisobutylene and polyhexene-1 having a flexural modulus of less than 100 kg/cm$^2$, a glass transition temperature of not higher than 0° C. and a weight average molecular weight of at least 400,000.

2. The composition of claim 1 comprising 60 to 97 parts by weight of the modified polyolefin (A) and 3 to 40 parts by weight of the thermoplastic polymer (B).

3. The composition of claim 1 wherein the polymer (B) is dispersed in the form of particles having an average circle equivalent diameter of 0.1 to 5 microns in a matrix of the modified polyolefin (A).

4. The composition of claim 3 wherein the polymer (B) is dispersed in the form of particles having an average circle equivalent diameter of 0.3 to 4 microns.

5. The composition of claim 1 wherein the modified polyolefin (A) has an intrinsic viscosity [$\eta$] of 0.8 to 7 dl/g and a degree of crystallization of at least 25%.

6. The composition of claim 1 wherein the ratio of the weight average molecular weight ($\overline{M}w$) of the modified polyolefin (A) to its number average molecular weight ($\overline{M}n$) is in the range of from 1 to 30.

7. The composition of claim 1 wherein the modified polyolefin (A) is the styrene hydrocarbon-grafted polyolefin graft-modified with $10^{-5}$ to $5 \times 10^{-3}$ gram-equivalent per gram of the polyolefin, of a styrene hydrocarbon.

8. The composition of claim 7 wherein the styrene hydrocarbon is styrene, m-methylstyrene or p-methylstyrene.

9. The composition of claim 1 wherein the thermoplastic polymer (B) comprises the polymer (B-1) which has a glass transition temperature (Tg) of $-130°$ to $-20°$ C. and a weight average molecular weight of at least 500,000.

10. The composition of claim 1 wherein the thermoplastic polymer (B) comprises polyhexene-1.

11. The composition of claim 1 wherein the thermoplastic polymer (B) has a degree of crystallization of not more than 30%.

12. An adhesive composed of the composition of claim 1 with at least one additive selected from the group consisting of antioxidants, ultraviolet absorbers, antistatic agents, pigments, dyes, nucleating agents, fillers, slip agents, fire retardants, and plasticizers.

13. The composition of claim 1 wherein the styrene hydrocarbon is a styrene compound of the following formula

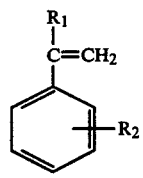

wherein $R_1$ represents a hydrogen, or an alkyl group having 1 to 6 carbon atoms, and $R_2$ represents a hydrogen atom, a halogen atom, or an alkyl group having 1 to 6 carbon atoms.

14. The composition of claim 7 wherein the thermoplastic polymer (B) comprises polyisobutylene.

15. The composition of claim 1 wherein the polyolefin of the modified polyolefin of component (A) is a homopolymer or copolymer of at least one alpha-olefin having from 2 to 20 carbon atoms.

16. The composition of claim 15 wherein the polyolefin is selected from the group consisting of polyethylene, ethylene/propylene copolymer, ethylene/1-butene copolymer, ethylene/4-methyl-1-pentene copolymer, ethylene/1-hexene copolymer, ethylene/1-octene copolymer, ethylene/1-decene copolymer, ethylene/vinyl acetate copolymer, ethylene/ethylacrylate copolymer, ethylene/acrylic acid copolymer, partially neutralized salt of an ethylene/acrylic acid copolymer, ethylene/methacrylic acid copolymer, partially neutralized salt of an ethylene/methacrylic acid copolymer, ethylene/ethylacrylate/butylacrylate copolymer, partially neutralized salt of an ethylene/ethylacrylate/butylacrylate copolymer, ethylene/methacrylic acid/butylmethacrylate copolymer, partially neutralized salt of an ethylene/methacrylic acid/butyl methacrylate copolymer, ethylene/maleic anhydride copolymer, ethylene/maleic anhydride/ethylacrylate copolymer, ethylene/maleic anhydride/butylacrylate copolymer, polypropylene, propylene/ethylene copolymer, propylene/1-butene copolymer, propylene/1-hexene copolymer, propylene/4-methyl-1-pentene copolymer, polybutene-1, 1-butene/ethylene copolymer, 1-butene/propylene copolymer, 1-butene/4-methyl-1-pentene copolymer, 1-butene/1-hexene copolymer, poly-4-methyl-1-pentene, 4-methyl-1-pentene/ethylene copolymer, 4-methyl-1-pentene/propylene copolymer, 4-methyl-1-pentene/1-decene copolymer, 4-methyl-1-pentene/1-octadecene copolymer, 4-methyl-1-pentene/3-methyl-1-pentene copolymer, and grafted products of any one of the aforementioned alpha-olefin copolymers or ethylene/vinyl monomer copolymers with at least one unsaturated carboxylic acid wherein the grafted polymer contains not more than 3 mole% of the unsaturated carboxylic acid.

17. The composition of claim 1 wherein the modified polyolefin (A) is the styrene hydrocarbon-grafted polyolefin graft-modified with $2 \times 10^{-5}$ to $2 \times 10^{-3}$ gram-equivalent, per gram of the polyolefin, of a styrene hydrocarbon.

* * * * *